United States Patent Office.

JOHN G. COOK, OF LEWISTON, MAINE.

Letters Patent No. 61,320, dated January 22, 1867.

---

IMPROVED DENTIFRICE.

---

*The Schedule referred to in these Letters Patent and making part of the same.*

---

TO ALL WHOM IT MAY CONCERN:

Be it known that I, JOHN G. COOK, of Lewiston, in the county of Androscoggin, and State of Maine, have invented an Improved Dentifrice; and I do hereby declare that the following is a description of my invention sufficient to enable those skilled in the art to practise it.

The invention relates to the preparation of dentifrice or powder for cleansing teeth, and consists in combining chlorate of potassa with a base of chalk or other similar powder, and with other ingredients used for the purpose of perfuming, making palatable, or otherwise improving the dentifrice; these ingredients with which the chlorate is combined being such as are now used in preparing dentifrices, or others that may be used, to which the addition of the chlorate of potassa imparts a cleansing and purifying power not hitherto possessed by any other preparation, while it contains no article which can injure the teeth or gums.

The ingredients with which I prefer to combine the chlorate of potassium, using chalk as a base, are sugar, myrrh, Peruvian bark, and oil of wintergreen, combining the whole preferably in the following or substantially these proportions: chlorate of potassa, 7 pounds; prepared chalk, (English precipitate,) 28 pounds; powdered myrrh, 14 ounces; Peruvian bark, (red,) 28 ounces; sugar, 14 pounds; oil of wintergreen, 8 ounces. These ingredients are thoroughly incorporated and reduced to impalpable powder by any of the well-known means of intermixing, pulverization, and screening. The astringent properties of the bark, the tendency of the myrrh to contract the gums upon the teeth, the palatableness of the sugar, and the flavor of the wintergreen, are all well known; and when to these is added the chlorate of potassa, I obtain a preparation not only pleasant and unobjectionable, but of great efficacy in cleansing the teeth from all impurities, conducing to the preservation of the teeth, and to a healthful condition of the mouth.

Of this dentifrice, Dr. A. A. Hayes, of Boston, "State Assayer," under date of February 20, 1866, testifies as follows: "I have carefully examined your 'chlorate dentifrice,' both chemically and physically. In composition it accords with the recipe, and is free from any metallic or mineral compound which can injure the teeth. It cleanses the surface of the teeth without abrading them, and it contracts the gums firmly on them, while its chlorate-compound destroys any decaying matter adhering to them."

I claim as a dentifrice, a chlorate compound, made up of ingredients substantially as described.

JOHN G. COOK.

Witnesses:
WM. P. FRYE,
JAS. E. HARTWELL.